Feb. 10, 1942.  C. H. YOUNG, JR  2,272,960
VALVE
Filed March 21, 1941

Inventor:-
Charles H. Young Jr.
by his Attorneys
Howson & Howson

Patented Feb. 10, 1942

2,272,960

UNITED STATES PATENT OFFICE 2,272,960

VALVE

Charles H. Young, Jr., Wayne, Pa., assignor to The Hale Fire Pump Co., Inc., Conshohocken, Pa., a corporation of Pennsylvania Application March 21, 1941, Serial No. 384,557

9 Claims. (Cl. 251—125)

This invention relates to improvements in valves of the type adapted for application to the exhaust line of an internal combustion engine for the purpose of diverting the fluid pressure of the exhaust to a pump-priming ejector, or for other purposes.

One object of the invention is to provide a valve unit of the stated type which shall be substantially immune to the burning and corrosive effects of the hot exhaust gases.

Another object of the invention is to provide a valve in which the movable valve element shall normally be substantially removed from the stream of hot exhaust gases.

Still another object of the invention is to provide a valve having simplified and generally improved actuating means eliminating the requirement for stiff springs, toggles and similar devices conventionally employed in valves of this class.

A further object of the invention is to provide a valve unit of the stated type wherein provision is made for inducing a backflow of cooling air through the bypass extending to the priming or other apparatus during the periods when the valve is open and the priming or other device is inoperative, said backflow operating to maintain the priming device in cool condition and retarding corrosion and the formation of carbon deposits in the bypass and associated parts.

A still further object of the invention is to provide means for utilizing the flow of the exhaust gases to set up a circulation of cooling air through the valve unit when the valve is open, to thereby maintain the parts, and particularly the valve seat, in relatively cool condition.

Figure 1:
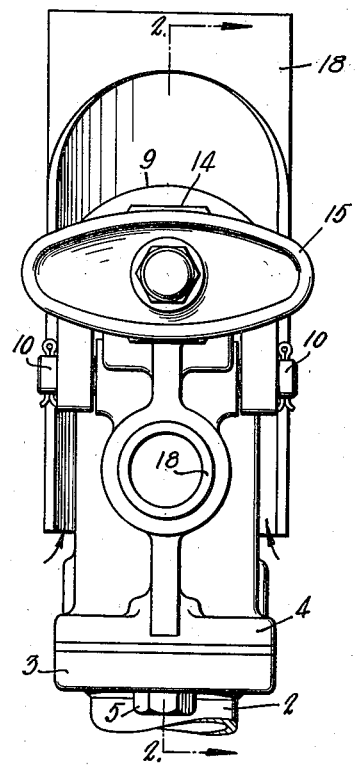
Figure 2:
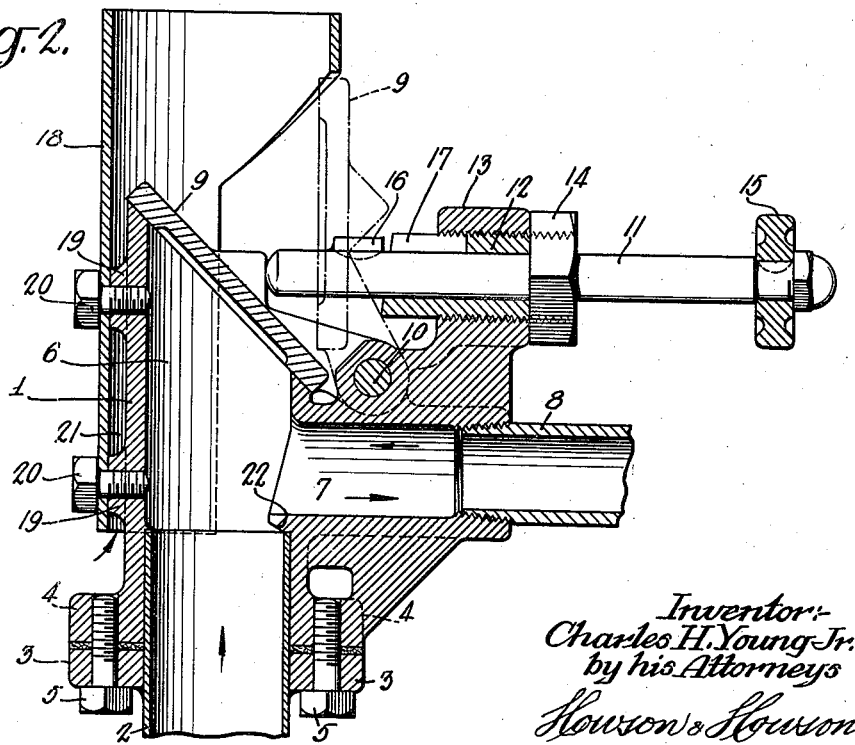

The invention further resides in certain structural and mechanical details hereinafter described and illustrated in the attached drawing, wherein:

Figure 1 is a side view of a valve unit made in accordance with my invention, and Fig. 2 is a section on the line 2—2, Fig. 1.

With reference to the drawing, the valve unit as therein illustrated comprises a casing 1 which is adapted to be attached to the end of an exhaust pipe 2 of an internal combustion engine. In the present instance, the pipe 2 is provided with a flange 3, and the casing 1 with a corresponding flange 4, said flanges in assembly being secured together through the medium of screws 5.

The casing 1 comprises a main channel or passage 6 which in assembly extends in alignment with and, in effect, forms a continuation of the exhaust pipe 2. The casing further comprises a bypass channel 7 which extends transversely from the inner end and side of the channel 6. The casing at the outer end of the bypass channel 7 is threaded for reception of a pipe 8 which may extend to a pump-priming ejector or other fluid-actuated device.

The end of the casing 1, in which the outer end of the passage 6 terminates, is formed in a plane inclined to the longitudinal axis of the said duct, and preferably the angle of inclination is approximately 45°. This end of the casing forms a seat for a valve element 9 which is pivotally secured to the casing 1 through the medium of a pin 10. As shown in Fig. 2, the valve element, when closed, seats accurately upon the inclined end of the casing, and said element is retractable on the pivot 10 to a position illustrated in broken lines in Fig. 2, wherein the said element occupies a plane substantially parallel to the longitudinal axis of the duct 6. It will be apparent that when the valve element 9 is seated upon the end of the casing 1, the exhaust gases entering the casing are diverted through the bypass 7 to the pipe 8.

Means is provided in the form of an actuating rod 11 for moving the valve element 9 to the seated position. The rod 11 is rotatable and slidably supported in a sleeve 12 which is threaded into a tapped hole in the outer end of an arm 13 of the casing 1. The threaded connection between the sleeve 12 and the arm 13 provides for longitudinal adjustment of the sleeve in the arm, and a lock nut 14 is provided for securing the sleeve in adjusted position. A handle element 15 on the rod 11 provides for manipulation of the rod in the guiding sleeve.

The rod 11 carries a boss 16 which, when the rod is retracted, enters a slot 17 in the wall of the sleeve 12. When the boss 16 occupies the slot 17, the rod 11 is held against rotary movement, but is free to be advanced in the sleeve so as to move the valve element 9 into seated position, as shown in Fig. 2. The boss 16 constitutes a stop which, by engagement with the inner end of the slot 17, limits the retractive movement of the rod 11.

The inner end of the sleeve 12 is formed in a plane somewhat inclined to the axis of the bore of the sleeve 12 and to the longitudinal axis of the rod 11, see Fig. 2. When the rod has been advanced to the full extent required to seat the valve element 9, a subsequent rotary movement of the rod 11 brings the boss 16 into engagement with the inclined surface of the proximate end of the sleeve 12, whereby this surface acts as a cam to further forcibly advance the rod 11 against the valve element 9, and to lock the rod in the advanced position to retain the valve element 9 pressed solidly against its seat on the casing 1. In releasing the valve element 9, the rod 11 is first turned through an angle sufficient to bring the boss 16 into alignment with the slot 17, and is then retracted as previously described. The pressure of the exhaust in the casing 1 then tends to swing the valve element 9 outwardly away from the seat into the position shown in dotted lines in Fig. 2. A light spring (not shown) may be, and preferably is, associated with the valve element so as to draw the valve to, and to normally retain it in, the retracted or open position. The aforedescribed means for longitudinal adjustment of the sleeve 12 provides for bringing the inner end of the sleeve in proper camming relation with respect to the boss 16 when the rod is in the fully advanced or valve-closing position.

Partially embracing the casing 1, or that portion of the casing which contains the primary passage 6, is a jacket 18, this jacket seating upon bosses 19, 19 on the outside of the casing, and being secured to the latter by means of screws 20. The jacket 18 is spaced from the wall of the casing 1 to an extent corresponding to the height of the bosses 19, thereby forming an open-ended channel 21 which partially embraces the wall of the channel 6. One side of the jacket 18 is open to accommodate the movements of the valve element 9.

As previously described, the bypass 7 is adapted to be connected, through the pipe 8 in the present instance, with an ejector constituting the actuating element of a pump priming or other device. Normally when the valve is open, the exhaust gases pass directly and unobstructed through the passage 6 for discharge through the outer end of the jacket 18. The casing 1 is formed around the inner end of the bypass 7 to provide a lip 22 which projects into the channel 6 from that side of the bypass 7 which adjoins the exhaust pipe 2. Preferably the outer side surface of the lip is beveled, as illustrated, so as to be inclined to the direction in which the exhaust gases normally move in entering the channel 6. The lip 22 acts thereby as a deflector directing the inflowing gases away from the mouth of the bypass 7. When the valve 9 is open, this deflection of the gases and the subsequent flow thereof through the channel 6 creates a suction effect upon the inner end of the bypass 7, thereby tending to induce a backflow of cooling air through the bypass 7 and the pipe 8 to the channel 6. This induced flow through the exhaust ejector, to which the pipe 8 is connected as previously set forth, and through the pipe between the ejector and the exhaust valve, maintains the ejector parts in relatively cool condition, and tends to prevent carbon deposit and corrosion which would develop if the ejector and connecting pipe were continually subjected to the action of the exhaust gases. This influx of cool air into the chamber 6 tends also to reduce the temperature of the exhaust gases as they flow from this chamber and past the valve seat and the valve element 9, and thereby reduces the heat to which these parts are subjected in normal operation. A further cooling effect is obtained by the jacket 18, since the exhaust gases passing rapidly through the outer end of this jacket induce a flow of cooling air through the channel 21 between the jacket and the wall of the casing, this circulation of air additionally aiding in maintaining the parts, and particularly the valve seat, free from the harmful effects of the hot exhaust gases. It will be noted further that the valve unit is formed so that under normal conditions the valve seat and the clapper are exposed to the atmosphere, and are not submerged in the high temperature exhaust gases.

The forming of the valve seat in a plane inclined to the longitudinal axis of the chamber 6 materially reduces the angle through which the valve element 9 must be moved from its normal retracted position until it engages its seat. This relatively small angular movement of the valve makes possible the efficient use of the simple push-rod actuating means. The push-rod actuating device has the material advantage of extreme simplicity, quick closing of the valve by simple longitudinal movement of the rod, and positive locking of the valve on its seat by subsequent simple angular movement of the rod. The adjustability of the actuating means through the medium of the threaded sleeve 12 also makes unnecessary extremely close tolerance machining of the valve, valve seat and pivot pin location in relation to the location of the cam and the position of boss 16 on push rod 11. The exposure of the parts to atmosphere and the additional provision for cooling the parts of the valve and of the associated ejector mechanism insures longevity and the maintenance of maximum efficiency.

I claim:

1. A valve unit comprising a casing having intake and discharge ports defining the ends of a primary flow passage, and a secondary discharge port opening from the side of said passage, a valve element operatively associated with said primary discharge port, a valve-actuating push rod slidably mounted in the casing and operative when advanced to move the valve to port-closing position, and means operative by rotative movement of the rod for locking the latter in the advanced position.

2. A valve unit comprising a casing having intake and discharge ports defining the ends of a primary flow passage, and a secondary discharge port opening from the side of said passage, a valve element operatively associated with said primary discharge port, guide means on said casing, a valve-actuating push rod slidably supported in said guide and operative when advanced to move the valve to port-closing position, a cam on said guide, and means on the rod reactive with the cam when the rod is in advanced position and by rotative movement of the rod for locking the rod in said advanced position.

3. A valve unit comprising a casing having intake and discharge ports defining the ends of a primary flow passage, and a secondary discharge port opening from the side of said passage, a valve element movably mounted on the casing, a seat for said valve at the discharge end of said primary passage and embracing the discharge port of the latter, guide means on said casing, a valve-actuating push rod slidably supported in said guide and operative when advanced to move the valve to said seat, a relatively fixed cam, and means on the rod reactive with the cam when the rod is in advanced position and by rotative movement of the rod for forcibly pressing the valve against said seat and for locking the rod in the advanced position.

4. A valve unit comprising a casing having intake and discharge ports defining the ends of a primary flow passage, and a secondary discharge port opening from the side of said passage, a valve element movably mounted on the casing, a seat for said valve at the discharge end of said primary passage and embracing the discharge port of the latter, guide means on said casing, a valve-actuating push rod slidably supported in said guide and operative when advanced to move the valve to said seat, a cam on said guide, means on the rod reactive with the cam when the rod is in advanced position and by rotative movement of the rod for forcibly pressing the valve against said seat and for locking the rod in the advanced position, and means for adjusting the guide with respect to said seat.

5. A valve unit comprising a casing having intake and discharge ports defining the ends of a primary flow passage, and a secondary discharge port opening from the side of said passage, a valve element movably mounted on the casing, a seat for said valve at the discharge end of said primary passage and embracing the discharge port of the latter, a cylindrical guide on said casing, a valve-actuating push rod slidably supported in said guide and operative when advanced to move the valve to said seat, cam means at the valve-adjoining end of the guide, a boss on said rod reactive with the cam when the rod is in advanced position and by rotative movement of the rod for forcibly pressing the valve against said seat and for locking the rod in the advanced position, said guide being longitudinally slotted for reception of said boss when the rod is retracted.

6. A valve unit comprising a casing having intake and discharge ports defining the ends of a primary flow passage, and a secondary discharge port opening from the side of said passage, a valve seat at the discharge end of said primary passage and embracing the discharge port of the latter, said seat being formed in a plane inclined to the longitudinal axis of said passage, a valve element pivotally mounted on the casing at one side of and facing said seat for angular movement into engagement with the latter, and a push rod slidably mounted in said casing for forcing the valve to said seat.

7. A valve unit comprising a casing having intake and discharge ports defining the ends of a primary flow passage, and a secondary discharge port opening from the side of said passage, a valve element operatively associated with said primary discharge port, and means operative when said valve is open and by flow of fluid through said primary passage for setting up a circulation of cooling air around the wall of said primary passage.

8. A valve unit comprising a casing having intake and discharge ports defining the ends of a primary flow passage, a secondary discharge port opening from the side of said passage, a valve unit movably mounted on said casing and adapted to seat on the casing at the discharge end of said primary passage to thereby close the primary discharge port, and a jacket embracing and spaced from the wall of said primary passage and extending beyond the primary discharge port, said jacket being operative by flow of fluid from the last-named port to set up a circulation of cooling air over the wall of said primary passage and over said valve seat.

9. A valve unit comprising a casing having intake and discharge ports defining the ends of a primary flow passage, a secondary discharge port opening from the side of said passage, a valve unit movably mounted on said casing and adapted to seat on the casing at the discharge end of said primary passage to thereby close the primary discharge port, and a jacket embracing and spaced from the wall of said primary passage and extending beyond the primary discharge port, said jacket being operative by flow of fluid from the last-named port to set up a circulation of cooling air over the wall of said primary passage and over said valve seat, and said jacket having an opening in the side thereof providing for retraction of the valve element to an inoperative position removed from the path of the fluid passing through said primary passage and exposed to the atmosphere.

CHARLES H. YOUNG, Jr.